United States Patent
Smykowski et al.

(10) Patent No.: US 12,296,729 B2
(45) Date of Patent: May 13, 2025

(54) SEATING ARRANGEMENT, INCLUDING FOR ADA BUS INTERIOR

(71) Applicants: Jędrzej Smykowski, Dabrowka (PL); Łukasz Firlej, Wolsztyn (PL)

(72) Inventors: Jędrzej Smykowski, Dabrowka (PL); Łukasz Firlej, Wolsztyn (PL)

(*) Notice: Subject to any disclaimer, the term of this patent is extended or adjusted under 35 U.S.C. 154(b) by 0 days.

(21) Appl. No.: 17/803,271

(22) Filed: Apr. 14, 2022

(65) Prior Publication Data

US 2023/0331125 A1    Oct. 19, 2023

(51) Int. Cl.
| | |
|---|---|
| B60N 2/30 | (2006.01) |
| A61G 3/08 | (2006.01) |
| B60N 2/01 | (2006.01) |
| B60N 2/24 | (2006.01) |

(52) U.S. Cl.
CPC .......... B60N 2/3038 (2013.01); A61G 3/0808 (2013.01); B60N 2/01 (2013.01); B60N 2/242 (2013.01); B60N 2/3088 (2013.01)

(58) Field of Classification Search
CPC .......... B60N 2/242; B60N 2/245; B60N 2/01; B60N 2/3088; B60N 2/3038; A61G 3/0808; A47C 1/121
USPC .................. 297/14, 331, 335, 217.3, 344.21; 296/65.04, 65.03, 65.09, 65.06
See application file for complete search history.

(56) References Cited

U.S. PATENT DOCUMENTS

| | | | | |
|---|---|---|---|---|
| 656,583 | A * | 8/1900 | Levin | A47C 1/12 297/423.15 |
| 1,239,185 | A * | 9/1917 | Hunt | B60N 2/3065 297/411.33 |
| 1,747,717 | A * | 2/1930 | Hummert | B60N 2/3011 248/240.4 |
| 4,740,030 | A * | 4/1988 | Nordskog | B64D 11/0691 297/14 |
| 4,955,973 | A * | 9/1990 | Provencher | B60N 2/34 297/335 |
| 5,328,231 | A * | 7/1994 | Raymond | A47C 1/12 297/335 |

(Continued)

FOREIGN PATENT DOCUMENTS

| | | | | |
|---|---|---|---|---|
| DE | 102005020224 | * | 11/2006 | ........... A61G 3/0808 |
| EP | 1878609 A2 | * | 1/2008 | ........... A61G 3/0808 |
| WO | WO-2004024491 A1 | * | 3/2004 | ............. B60N 2/143 |

*Primary Examiner* — Milton Nelson, Jr.
(74) *Attorney, Agent, or Firm* — Ryan M. Fountain

(57) ABSTRACT

A seat assembly is provided which is mountable to a vehicle to be rotatable from a forward facing passenger use position to a lateral stowed position which requires less vehicular floor space. That seat assembly can be installed adjacent to a second forward facing seat assembly having hinged seat bottom structure which provides a wheelchair backstop/support when the second seat assembly is not occupied by any passenger. The first and second seating assembly can be mounted in a public transportation bus within the ADA area of the bus, either as a floorplan module or as separate components. The first seating assembly alone or in combination with the second seating assembly can be mounted in other vehicles, such as Class B motorhomes (as defined by the Recreational Vehicle Industry Association), to provide greater versatility and/or wheelchair accommodation. The aesthetic design is established to support passenger general approval of the overall floorplan orientation.

12 Claims, 13 Drawing Sheets

(56) References Cited

U.S. PATENT DOCUMENTS

| | | | | |
|---|---|---|---|---|
| 9,150,171 B2* | 10/2015 | Kim | ............... | B60N 2/879 |
| 2004/0113451 A1* | 6/2004 | Szymanski | ........ | B60N 2/01516 |
| | | | | 296/65.05 |
| 2014/0346825 A1* | 11/2014 | Mill | ............ | A61G 3/0808 |
| | | | | 297/331 |

* cited by examiner

SEATING ARRANGEMENT, INCLUDING FOR ADA BUS INTERIOR

BACKGROUND OF THE INVENTION

The present invention relates generally to seating for vehicles, and more particularly for seating arrangements for public transportation busses which are compliance with the Americans with Disabilities Act ("ADA").

Previously, public transportation busses had seating arrangements based largely upon a plurality of forward facing seats mounted adjacent the longitudinal sides of the bus on opposite sides of a central longitudinal aisle. These forward facing seats were generally constructed and mounted in pairs of two seats. More recently, the floorplans of such busses have been altered so as to provide great accessibility for wheelchairs and other personal mobility devices being used by passengers who are less able to access and use the conventional bus seats. [In this patent application, the term "floorplan" refers not to a graphic description, but rather to the article of manufacture itself, i.e., the structure mounted to the floor according to a plan for the seating arrangement.] Typically, these alterations have involved using an arrangement of laterally facing seats, instead of forward facing seats, wherein the seat bottoms can be folded up to reduce the floor space taken up by the seats and permit greater floor space for wheelchairs. [In this patent application, the term "wheelchair" refers not merely to actual wheelchairs, but also to any personal mobility device, wheeled or otherwise, which special or additional consideration or internal transportation of is needed by the bus or other applicable vehicle.] In addition, these alterations typically have involved the use of one or more fixed barriers, extending laterally across a portion of the width of the bus on one or both sides of the aisle, to serve as backstop and/or support for the wheelchair.

FIG. 1 illustrates the floorplan of one such typical "prior art" altered seating arrangement for providing greater accommodation of wheelchairs. These floorplans, as well as the floorplans of the present invention described below, can be marketed as either a modular assembly mounted to a bus chassis, or as a collection of individual components for retrofit mounting into a pre-existing bus floorplan.

Unfortunately, bus seating arrangements or floorplans of the type shown in FIG. 1 can have certain disadvantages. For example, in creating the ADA area in this way, the total seating capacity of the bus is reduced. This can significantly reduce the revenue from the bus service and/or increase the overall costs of bus service operation. Further, forward facing seats (or seats facing along the longitudinal axis of the vehicle) can provide greater passenger safety, in the event of bus collisions, as compared with lateral facing seating. Also, lateral facing seating in combination with lateral barriers can require more complicated installation than forward facing seating, thus increasing up-front costs of bus ownership. Still further, such lateral seating can require a higher net vehicle weight/passenger ratio, which adversely affects fuel economy, thus increasing the on-going operational costs of bus ownership. In addition, it can be important to maintain a reasonable level of internal aesthetic attractiveness of the bus interior in order to encourage passenger use, and detraction from forward facing seat uniformity can be detrimental in that regard.

Objectives of the Invention

Accordingly, a primary objective of the present invention is to provide improved seating arrangements for vehicles. These improvements include providing seating floorplans which:

a. have a less overall cost of manufacture, installation, and maintenance,
b. increase the economy and/or versatility of vehicle use and operation,
c. comply with ADA requirements for public transportation vehicles,
d. are aesthetically attractive to users,
e. accommodate a wide variety of "wheelchair" types and sizes, and
f. increase passenger safety and convenience.

SUMMARY OF THE INVENTION

These and other objectives of the present invention are achieved by the provision of a seat assembly which is mountable to a vehicle to be rotatable from a forward facing passenger use position to a lateral stowed position which requires less vehicular floor space. That seat assembly can be installed adjacent to a second forward facing seat assembly having hinged seat bottom structure which provides a wheelchair backstop/support when the second seat assembly is not occupied by any passenger.

The first and second seating assembly can be mounted in a public transportation bus within the ADA area of the bus, either as a floorplan module or as separate components. The first seating assembly alone or in combination with the second seating assembly can be mounted in other vehicles, such as Class B motorhomes (as defined by the Recreational Vehicle Industry Association), to provide greater versatility and/or wheelchair accommodation.

Other objects, advantages, and novel features of the present invention will become readily apparent from the following drawings and detailed description of certain preferred and alternative embodiments.

Characterization of the Design Aesthetics of the Invention:

The present invention comprises the aesthetic appearance of the interior seating arrangement of a bus that is laid out for compliance with the Americans with Disabilities Act (ADA). The interior seating arrangement for such ADA busses can be assembled and sold as a separate module for retro-fit or new installation into previously and/or separately build and sold bus chassis, or can be organically built from individual components into the bus chassis. The present invention differs from the prior art in that the forward area (sometimes referred to in the art as the "ADA area"), where wheelchairs and other mobility enhancing devices are securable when the bus is traveling, is characterized by greater forward facing seats, replacing laterally facing seats, and the conventional longitudinal barriers to wheelchair motion have been removed, providing a more uniform interior appearance, especially when the wheelchair support is not needed.

DETAILED DESCRIPTION OF PREFERRED EMBODIMENTS

Figure 1:
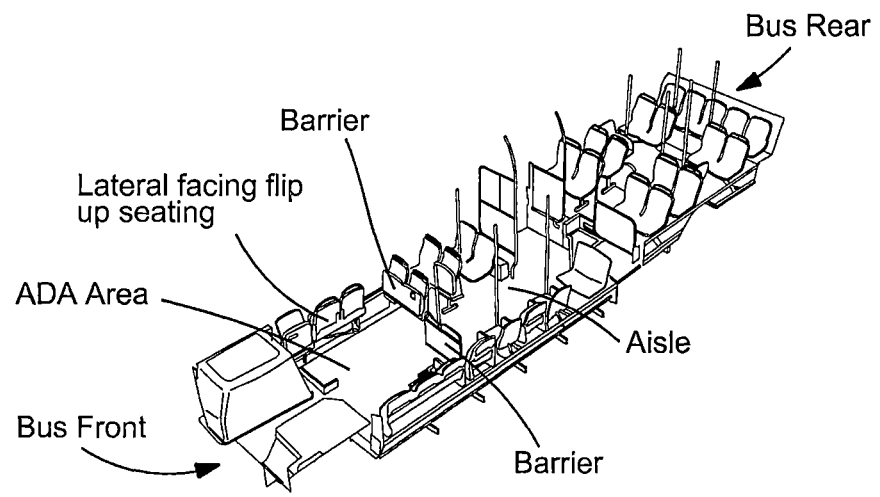
FIG. 1 is an upper front, right perspective view of a prior art ADA bus interior seating arrangement, with the lateral facing flip up seating in the ADA area in the raised position.

The figures show schematically, and in best mode versions, embodiments of the present invention, particularly as applied to a public transportation bus, both generically and specifically. The drawings are not precisely to scale from one to the next.

The following numbered features are illustrated in the drawings:

Vehicle 20, having:
  a front 22,
  a back 24,
  a left lateral side 26,
  a right lateral side 28,
  a driver area 30,
  longitudinal axis 32 along the primary direction of vehicle travel and along which the aisle of the interior of vehicle 20 is placed, in a conventional manner as with passenger busses,
  an interior floor 36, including ADA area 34 (for alternatively receiving and supporting wheelchairs or additional seated passengers in a conventional manner), the aisle extending along axis 32, and the foot space under lateral seat assemblies (located laterally of the aisle in conventional manner),
Seat arrangement 40, having:
  a first seat assembly 42, having
    seat elements 44 and 46, each having
      a first seat bottom portion 48,
      a first seat back portion 50,
    a second seat assembly, 52 having
      seat elements 54 and 56, each having
        a second seat bottom portion 58,
        a second seat back portion 60,
  Mounting structure 62, having
    cantilever mounting elements 64,
    rotation bearing 66,
    locking mechanism 68,
  Electronic interface 70,
  Passenger interface 72,
  Rotatable support handle 74, and
  Wheelchair retaining system 76.

Briefly, these elements interact as follows:

The first seat bottom portion is configured to support at least one seated passenger in the vehicle. The first seat back portion is attached to the seat bottom portion, and is configured to provide support for at least one passenger in the vehicle, as, for example, a backrest when the passenger is seated. The first seat bottom portion is assembled to be selectively movable in its orientation with respect to the first seat back portion so as to take up less floor space in a stowed position than when in a position to support at least one seat passenger. This can be accomplished, for example, by a conventional hinged connection between that seat bottom portion and that seat back portion which allows the seat bottom to be selectively flipped up (and/or down in other embodiments) by passengers or the vehicle operator, as and when needed.

The mounting structure is configured to attach the first seat assembly to the vehicle such that when at least one passenger is seated in the seat assembly, that passenger is oriented facing along that longitudinal axis. When the first seat bottom portion is in the stowed position, the first seat assembly is rotatable toward a lateral side of the vehicle, generally orthogonal to that longitudinal axis. This rotation is accomplished via releasing locking mechanism 68 and pivoting the seating assembly about rotational bearing 66. A variety of different conventional rotational bearings can be alternatively used in the mounting structure for this purpose. An especially suited new bearing structure and locking mechanism are shown in the drawings in sufficient detail to enable those skilled in the art to understand and use as a preferred embodiment of the present invention.

Figure 2:
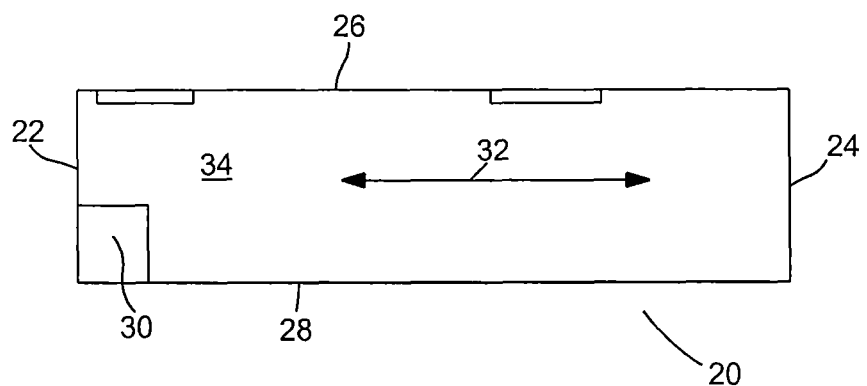
FIG. 2 is a top plan view of a public transportation bus into which the present invention may be applied.
Figure 3:
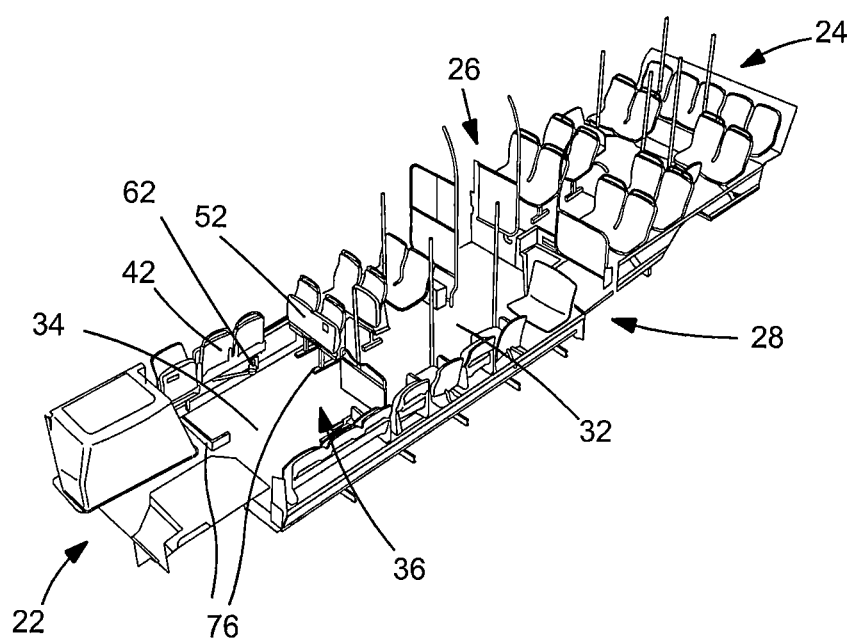
FIG. 3 is an upper front, right perspective view of an ADA bus interior seating arrangement according to the design of the present invention as if within the bus of FIG. 2, with the forward, rotatable front facing seats moved against the bus side wall and the foldable seats in the raised positions.
Figure 4:
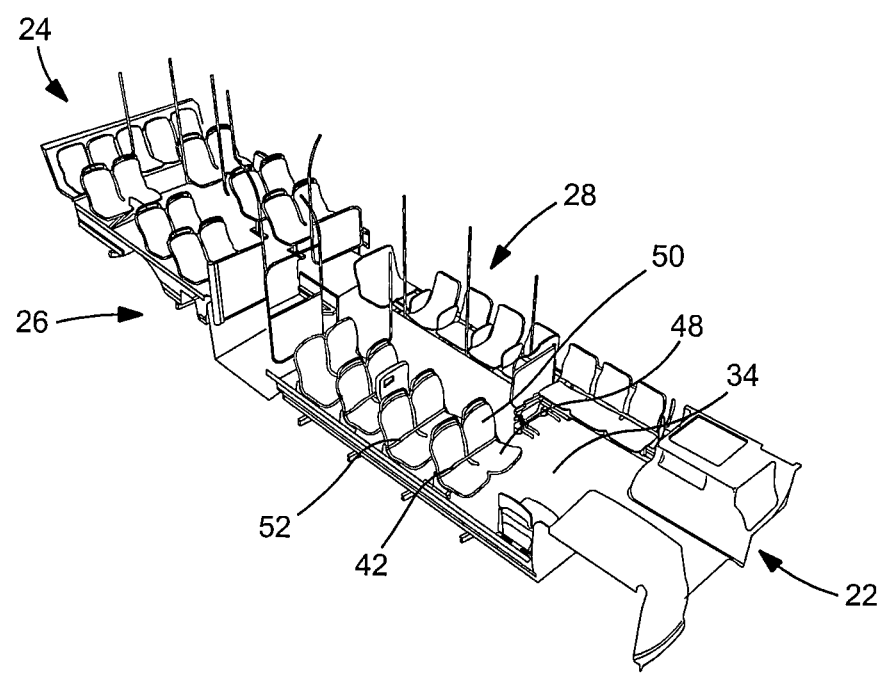
FIG. 4 is an upper front, left perspective view of the embodiment of FIG. 2, with the forward, rotatable front
Figure 5:
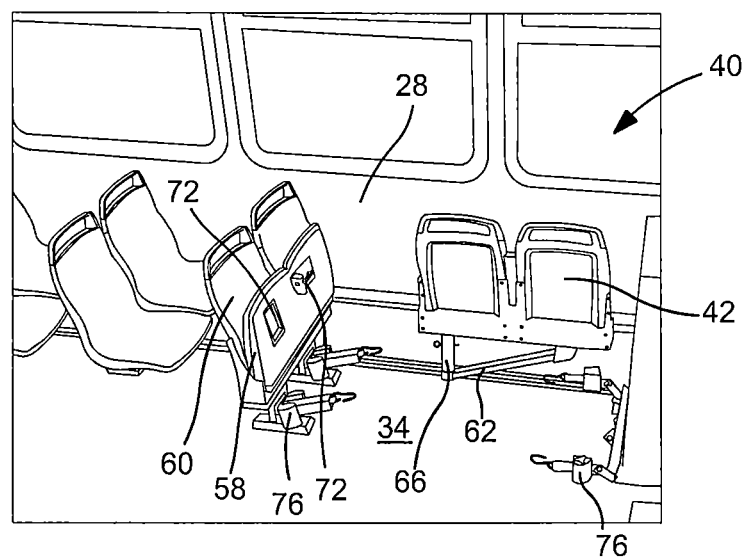
FIG. 5 is an enlarged view of the structure of forward, rotatable front facing seats and the foldable seats in the position of FIG. 2, illustrated and annotated herein as if on the right lateral side of the bus (instead of on the left lateral side of the bus, as see in FIGS. 3 and 4) to show more clearly a structural arrangement for achieving the present invention, and provide clear structural enablement under 35 U.S.C. § 112 for use of the present invention. The specific location and function of its structural elements are not part of the claimed aesthetic design.
Figure 6:
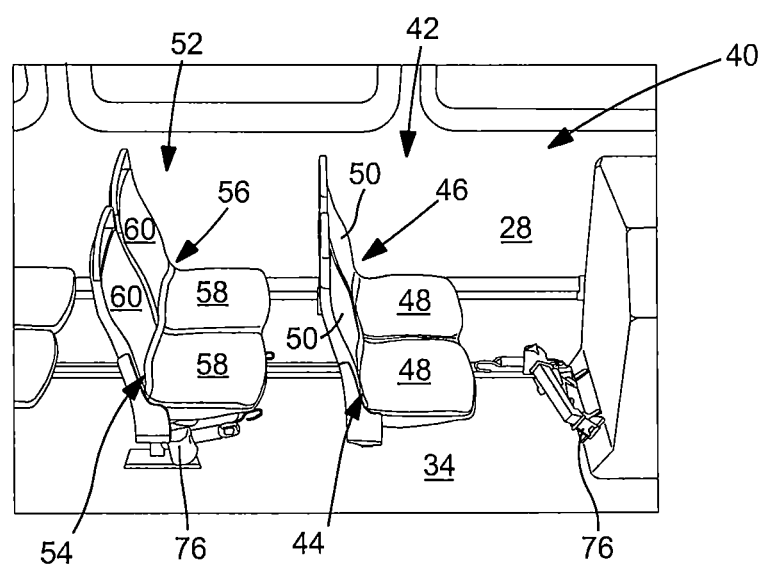
FIG. 6 is an enlarged view of the structure of FIG. 5 in the passenger seated usage position of FIG. 4.
Figure 7:
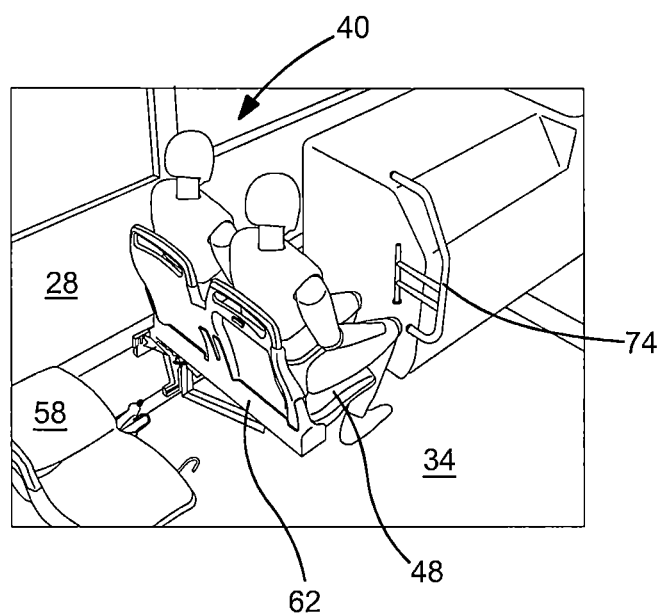
FIG. 7 is an enlarged, upper rear, left perspective view of the arrangement of FIG. 6 in the passenger usage position of FIG. 4 with the handle in place and rotated into the aisle of the ADA area, and illustrating two passenger figures.
Figure 8:
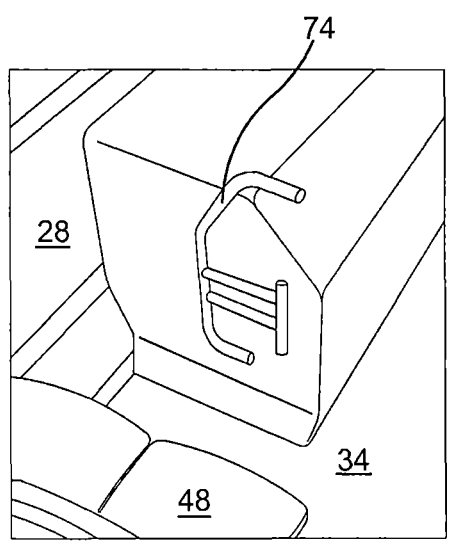
FIG. 8 is an enlarged, upper rear, left perspective view of the arrangement of FIG. 7, with the handle rotated out of the aisle and the passenger figures removed.
Figure 9:
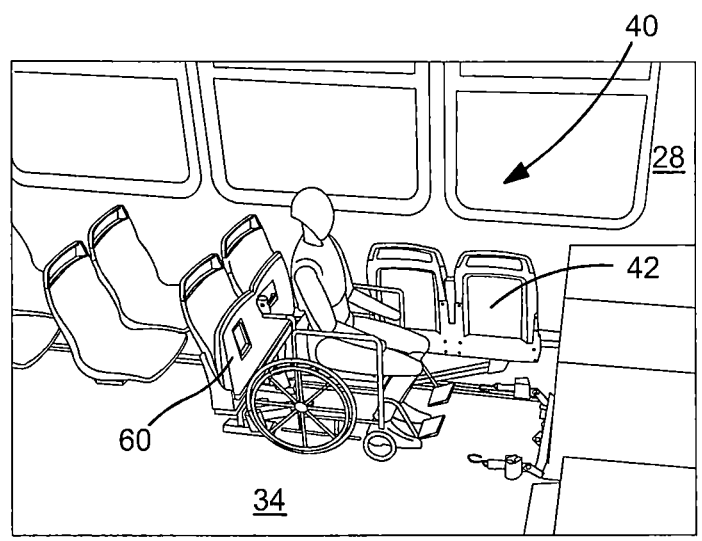
FIG. 9 is an upper right perspective view of the arrangement of FIG. 5 with and exemplary wheelchair passenger figure illustrated in place.
Figure 10:
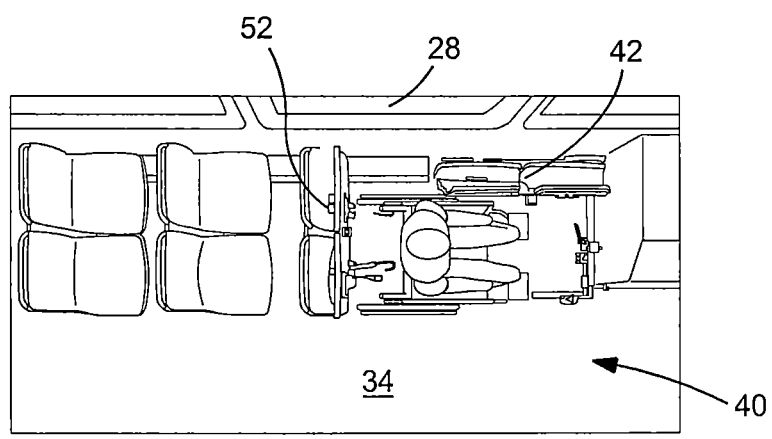
FIG. 10 is a top view of the arrangement of FIG. 9.
Figure 11:
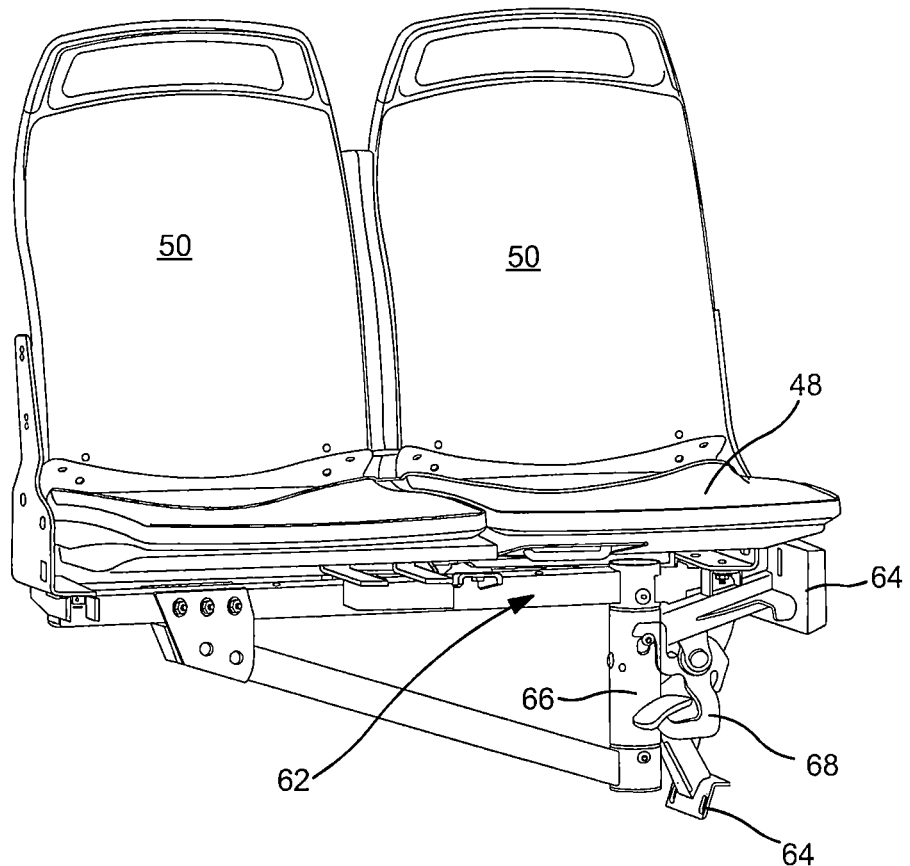
FIG. 11 is a front, left perspective view of the first seat assembly of FIG. 5.
Figure 12:
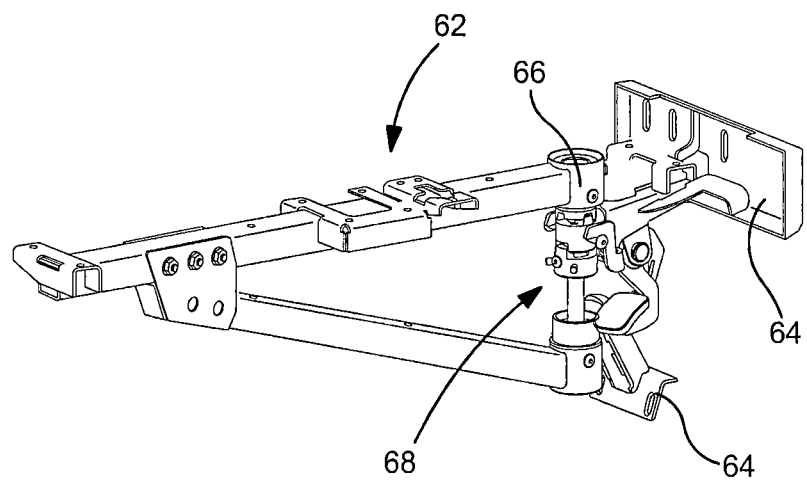
FIG. 12 is an enlarged front left perspective view of the mounting structure of FIG. 11, with interior portions of the locking mechanism revealed.
Figure 13:
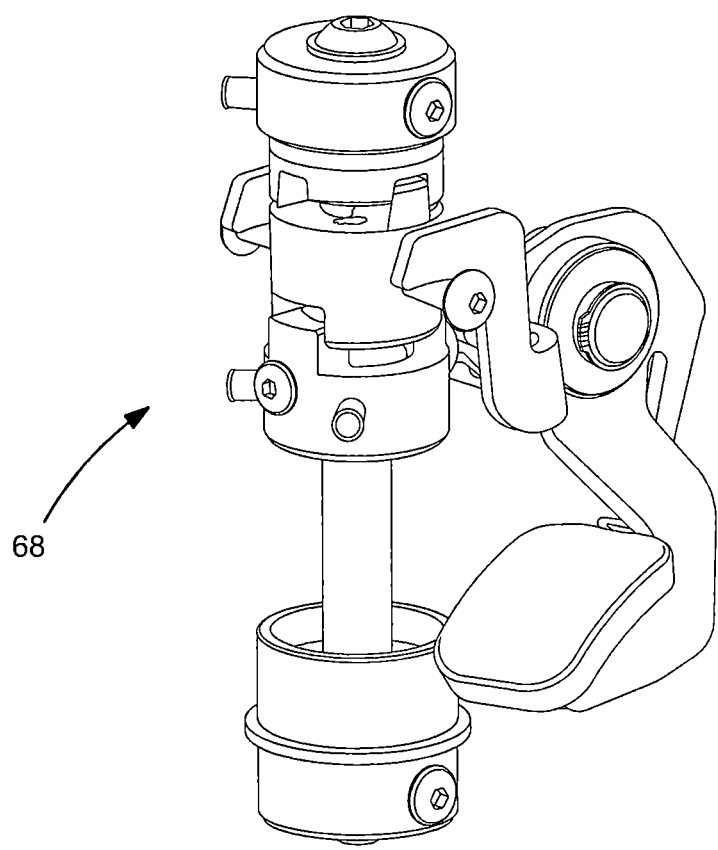
FIG. 13 is a further enlarged view of the interior portions of the locking mechanism of FIG. 12.
Figure 14:
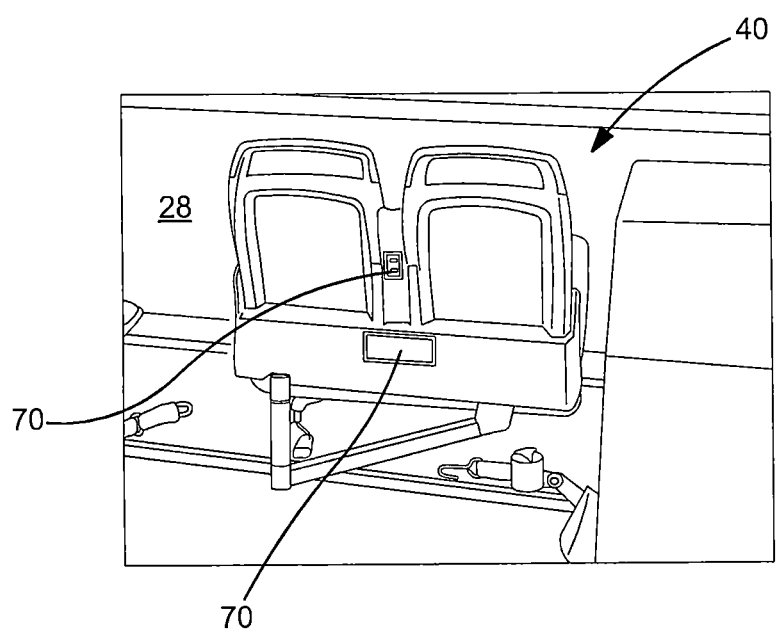
FIG. 14 is a side view of a portion of the arrangement of FIG. 5 with the electronic interface elements in place.

The second seat assembly is mounted into the vehicle adjacent to the first seat assembly, as shown in FIGS. 2 and 3. The a second seat bottom portion, configured to support at least one seated passenger in the vehicle. The second seat back portion attached to the seat bottom portion, and is configured to provide support for at least one passenger in the vehicle. The second seat bottom portion being assembled to be selectively movable in its orientation with respect to the second seat back portion so as to take up less floor space in a stowed position than when in a position to support at least one seat passenger. This can be accomplished, for example, by a conventional hinged connection between that seat bottom portion and that seat back portion which allows the seat bottom to be selectively flipped up (and/or down in other embodiments) by passengers or the vehicle operator, as and when needed. An example of a commercially available suitable seat bottom portion is found in the Kiel "Secubar" System. Such a seat bottom portion can provide sufficient support against movement of a wheelchair along the longitudinal axis when the second seat bottom is in its stowed position.

The electronic interface can include, for example, a call button for a wheelchair passenger to contact the vehicle operator, or an USB slot to facilitate passenger use of personal electronic devices. As shown in the drawings, the vehicle preferably includes conventional 3 or 4 belt wheelchair retaining systems, as needed in given instances, which can be mounted on the vehicle floor. The second seat bottom portion includes a passenger interface, such as one or more conveniently located and foldable handles, on its underside to facilitate movement of the second seat bottom portion into and out of its stowed position.

Although the present invention has been shown and described herein with respect to certain preferred embodiments and alternative configurations, those were by way of illustration and example only. For example, in especially preferred embodiments, the seating assemblies of the present invention can be applied to Class B motorhomes, conversion vans, or passenger trains. Further, the seating arrangements of the present invention can be applied as multiple rotational "first seat assembly" structures in tandem, between two "second seat assembly" structures. In certain embodiments, the second seat assembly may not be needed, as, for example, if a restraining belt or strap structure removes the need for a wheelchair backstop. Accordingly, the spirit and scope of the present invention is intended to be limited only by the terms of the appended claims.

What is claimed is:

1. A seating arrangement mountable into a vehicle, having a longitudinal axis along the primary direction of vehicle movement, comprising:
   a first seat assembly, having
      a first seat bottom portion, configured to support at least one seated passenger in the vehicle,
      a first seat back portion attached to the seat bottom portion, configured to provide support for at least one passenger in the vehicle,
      the first seat bottom portion being assembled to be selectively movable in its orientation with respect to the first seat back portion so as to take up less floor space in a stowed position than when in a position to support at least one seat passenger, and
      a mounting structure configured to attach the first seat assembly to the vehicle such that when at least one passenger is seated in the seat assembly, that passenger is oriented facing along that longitudinal axis, and when the first seat bottom portion is in the stowed position, the first seat assembly is rotatable toward a lateral side of the vehicle, generally orthogonal to that longitudinal axis,
      that mounting structure including:
         a cantilevered mounting element to be fixed to the lateral side of the vehicle,
         a rotatable bearing spaced from the lateral side of the vehicle when mounted in the vehicle and always covered during use by the first seat assembly,
         and the mounting structure movement consists of a single axis of rotation for the first seat assembly between the position supporting at least one seat passenger and the stowed position.

2. The seating arrangement according to claim 1, including a vehicle, and
   wherein a second seat assembly is provided which is mounted into the vehicle adjacent to the first seat assembly, the second seat assembly includes:
      a second seat bottom portion, configured to support at least one seated passenger in the vehicle,
      a second seat back portion attached to the seat bottom portion, configured to provide support for at least one passenger in the vehicle, and
      the second seat bottom portion being assembled to be selectively movable in its orientation with respect to the second seat back portion so as to take up less floor space in a stowed position than when in a position to support at least one seat passenger.

3. The seating arrangement according to claim 2 wherein the second seat bottom portion is constructed to provide support against movement of a wheelchair along the longitudinal axis when the second seat bottom is in its stowed position.

4. The seating arrangement according to claim 3 wherein the first and second seat assemblies each include two sets of seat elements for supporting passengers.

5. The seating arrangement according to claim 4 wherein the first and second seat assemblies are each cantilever mounted toward the lateral side of the vehicle.

6. The seating arrangement according to claim 5 wherein the first seating assembly includes an electronic interface for passengers which is accessible by at least one vehicle passenger when the first seat assembly is rotated toward a lateral side of the vehicle.

7. The seating arrangement according to claim 6 wherein the second seat bottom portion includes a passenger interface on its underside to facilitate movement of the second seat bottom portion into and out of its stowed position.

8. The seating arrangement according to claim 7 wherein the vehicle includes an interior floor, and the first and second seat assemblies are mounted to create an area within the vehicle for alternatively receiving and supporting wheelchairs and seated passengers.

9. The seating arrangement according to claim 8 wherein the first seat assembly is rotated so as to be adjacent the lateral side when the first seat bottom portion is in the stowed position.

10. The seating arrangement according to claim 9 wherein the seating arrangement is formed as a modular unit with a floor portion for the vehicle.

11. The seating arrangement according to claim 1 wherein the first seat bottom portion is adjacent the lateral side of the vehicle when it is mounted in the vehicle and is in the stowed position.

12. The seating arrangement according to claim 11 wherein the first seat back portion is exposed for abutment with a wheelchair when the first seat bottom portion is in the stowed position.

* * * * *